CONSTANT CURRENT SEMICONDUCTOR DEVICE

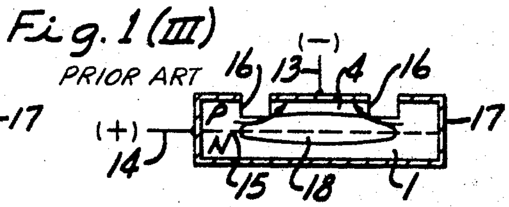
Fig. 1(III)
INVENTORS
TAKASHI SUZUKI &
TAKAHIDE WATANABE
BY
CAROTHERS & CAROTHERS
THEIR ATTORNEYS

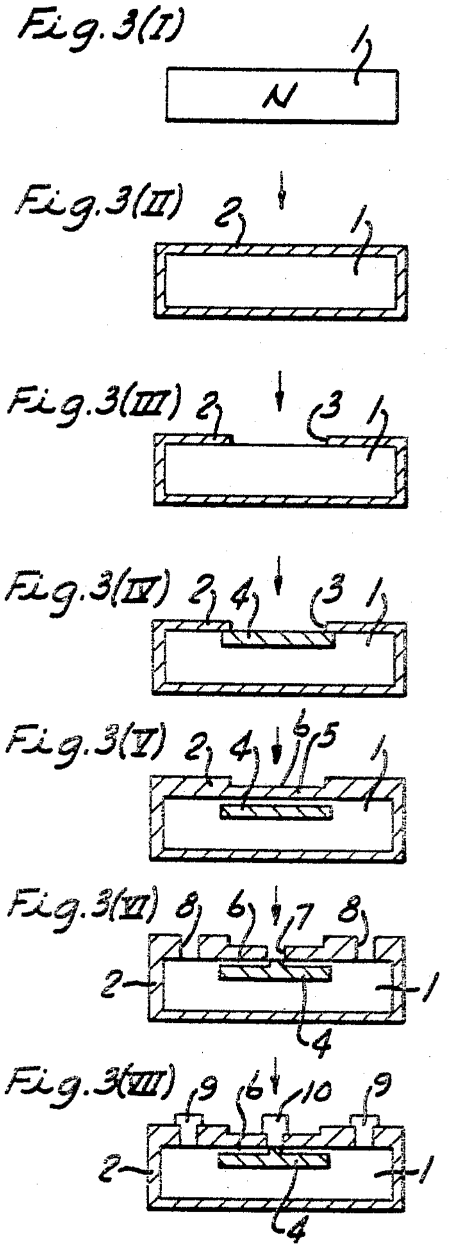
Fig. 3(I), Fig. 3(II), Fig. 3(III), Fig. 3(IV), Fig. 3(V), Fig. 3(VI), Fig. 3(VII)
INVENTORS
TAKASHI SUZUKI &
TAKAHIDE WATANABE
BY
CAROTHERS & CAROTHERS
THEIR ATTORNEYS Fig. 6(III)
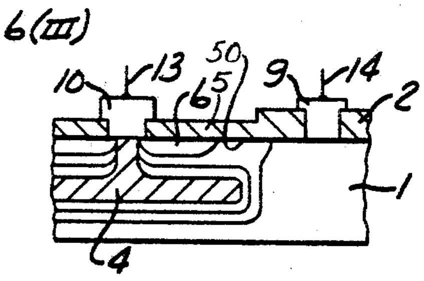
INVENTORS
TAKASHI SUZUKI &
TAKAHIDE WATANABE
BY
CAROTHERS & CAROTHERS
THEIR ATTORNEYS INVENTORS
TAKASHI SUZUKI &
TAKAHIDE WATANABE
BY
CAROTHERS & CAROTHERS
THEIR ATTORNEYS

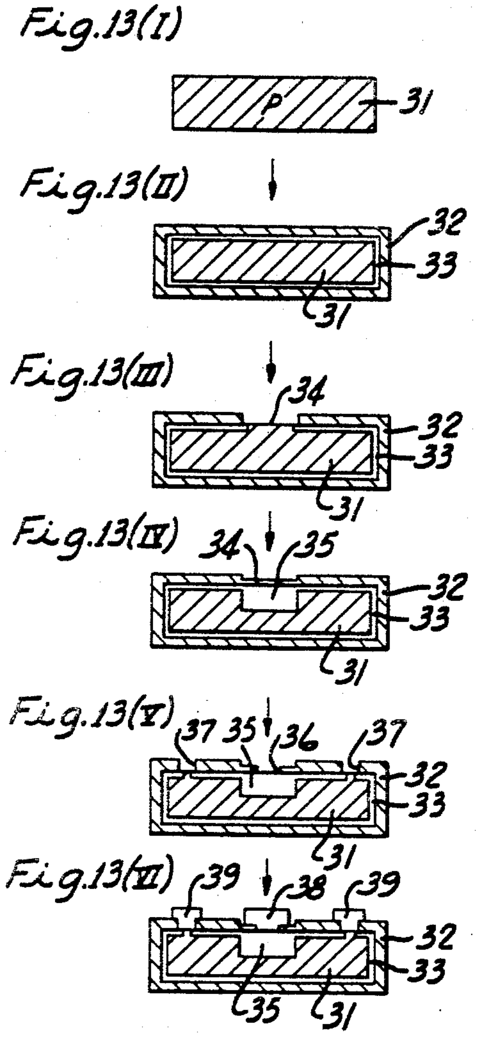
Fig.13(I), Fig.13(II), Fig.13(III), Fig.13(IV), Fig.13(V), Fig.13(VI)
INVENTORS
TAKASHI SUZUKI &
TAKAHIDE WATANABE
BY
CAROTHERS & CAROTHERS
THEIR ATTORNEYS 3,435,302

Takashi Suzuki, Ibaraki, and Takahide Watanabe, Nishinomiya, Japan, assignors to Sumitomo Electric Industries, Ltd., Osaka, Japan, a Japanese company Filed Nov. 24, 1965, Ser. No. 509,533

Claims priority, application Japan, Nov. 26, 1964, 39/66,777

Int. Cl. H01l *5/06*

U.S. Cl. 317—234 7 Claims

ABSTRACT OF THE DISCLOSURE

A constant current semiconductor device having a constant current effect within a range of applied voltages comprising a semiconductor substrate of one conductivity type upon a surface portion of which there is diffused therein a region having an opposite conductivity type. The surface of this region is provided with an oxide layer, such as, silicon dioxide, under which there is formed an inversion layer of the same conductivity type as the semiconductor substrate to isolate the diffused region within the substrate. For terminal connection, an opening is prepared through the oxide layer to expose the diffused region and the inversion layer which are coupled together upon fusion of the terminal in the provided opening. The desired geometrics of the inversion layer are controlled by the impurity concentration of the diffused region and the thickness and oxidizing conditions of the oxide layer. Such semiconductor devices may be of the polar or nonpolar variety.

This invention relates to a stabilizing semiconductor resistance device having the constant current characteristic which takes advantage of the field effect in the P-N junction device of semi-conductors. It will be hereinafter be referred to as a constant current semiconductor device.

More particularly, this invention makes it possible to obtain a constant current effect at voltages lower than before with a low-pinch-off voltage, a thin channel for current being obtained by inverting to N-type a thin layer on the surface of P-type diffused layer by again oxidizing the surface of a P-type diffused layer (layer of the type opposite to that of the substrate) previously produced by diffusing impurities in a N-type substrate. Needless to say, the same effect may be obtained from a thin channel for current being obtained by inverting to P-type a thin layer on the surface of an N-type diffused layer in a P-type substrate by again oxidizing the surface of the N-type diffused layer.

The object of this invention is to obtain a constant current device which has a constant current characteristic at lower voltages than before with a lower pinch-off voltage than before by means of a channel for current produced by inverting a thin layer on the surface of a diffused layer or substrate by thermal oxidation as already mentioned.

Another object of this invention is to manufacture a thin channel for current in a simple and easy way.

Still another object of this invention is to furnish a method for the manufacture of a constant current device having a thin channel for current, which shows little variation in product quality.

Still another object of this invention is to furnish a method of manufacturing a constant current device which makes it possible to control the thickness of the channel for current easily and accurately in accordance with the desired constant current characteristic.

A further object of this invention is to cover almost the whole of the surface of a constant current device with an oxidized film thereby to prevent changes in the characteristic due to soiling of the surface and due to the lapse of time under the influence of the atmosphere.

The accompanying drawings show for the purpose of exemplification without limiting the invention or claims thereto, certain practical embodiments illustrating the principles of this invention wherein:

FIGS. 1(I), 1(II), 1(III) and 1(IV) are enlarged cross sectional views of a prior art constant current semiconductor device showing the progressive effect of the space charged layer.

FIG. 2 is a voltage-current characteristic graph for the constant current device of FIG. 1.

FIGS. 3(I) through 3(VII) are enlarged sectional views showing the sequence in the manufacturing process of a polar constant current semiconductor device of the present invention with an N conductivity type material for the substrate.

Figure 6I:
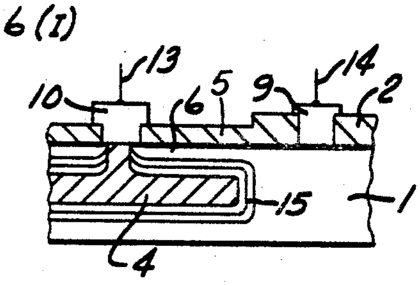
Figure 6:
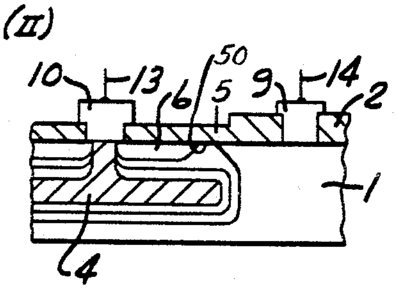

FIGS. 6(I) through 6(III) are enlarged partial sectional views of the constant current semiconductor device of the present invention to explain the operation of its constant current characteristics.

Figure 7:
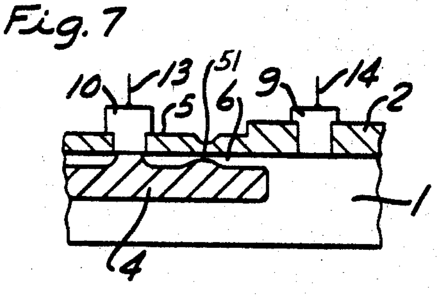

FIG. 7 is an enlarged partial sectional view showing a modification of the constant current device obtained by the process of FIG. 3(I) through 3(VII).

Figure 8:
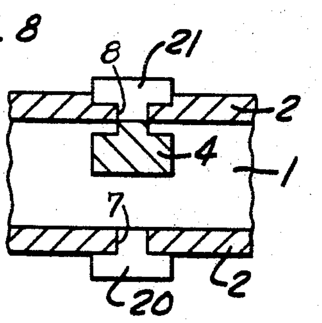

FIG. 8 is an enlarged partial sectional view wherein the terminal made to the substrate of the device is made from the bottom face of the substrate during the process of FIGS. 3(I) through 3(VII).

Figure 9:
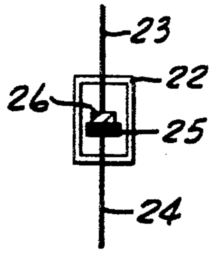

FIG. 9 is a sectional view of the constant current device obtained in the manner illustrated in FIG. 8 and installed in an enclosure.

Figure 10:
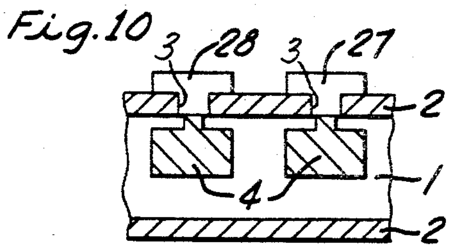

FIG. 10 is an enlarged partial sectional view of an embodiment of the present invention in a form of a nonpolar constant current semiconductor device.

Figure 11:
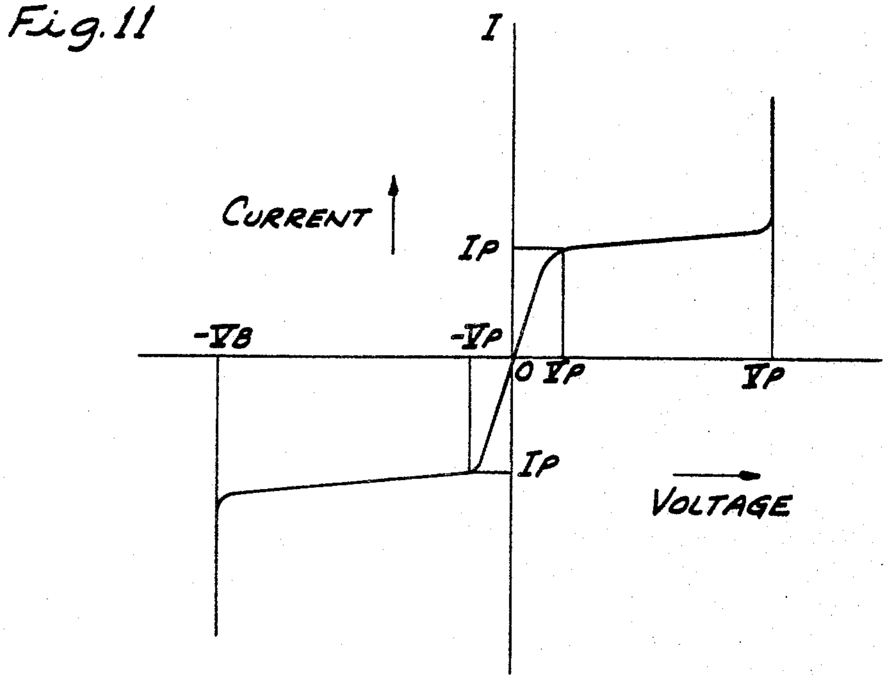

FIG. 11 is a voltage-current characteristic graph obtainable from the application of the nonpolar constant current semiconductor device as shown in FIG. 10.

Figure 12:
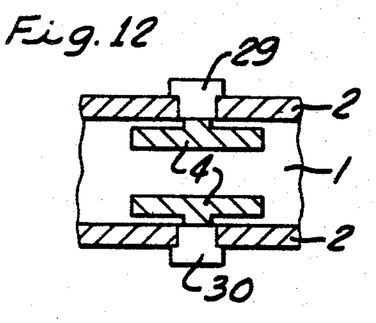

FIG. 12 is an enlarged partial sectional view of another embodiment of the present invention in the form of a nonpolar constant current device wherein the terminals made to the diffused layers are on the opposite faces of the substrate.

FIGS. 13(I) through 13(VII) are enlarged sectional views representing another embodiment of the present invention showing the sequence in the manufacturing process for a polar constant current semiconductor device with a P conductivity type material for the substrate.

Figure 14:
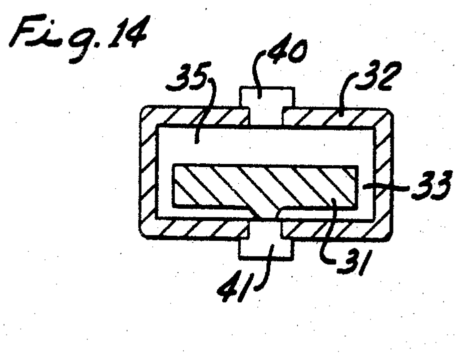

FIG. 14 is an enlarged sectional view showing a polar constant current semiconductor device wherein the terminal made to the diffused layer is on a surface opposite to that of the terminal made to the substrate.

Figure 15:
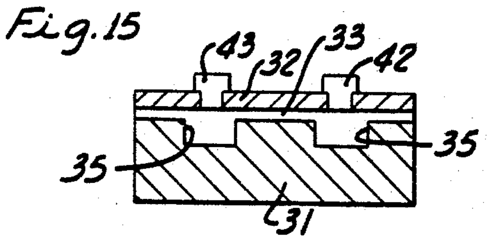

FIG. 15 is an enlarged partial sectional view showing an embodiment in the form of a nonpolar constant current semiconductor device having a P conductivity type material for the substrate.

Figure 16:
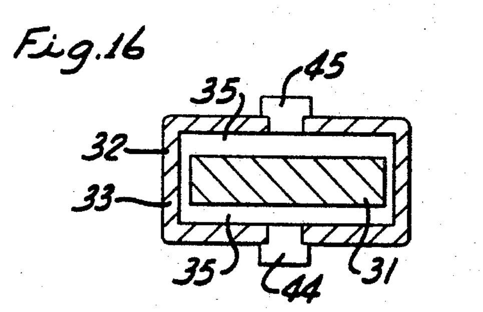

FIG. 16 is an enlarged sectional view showing another embodiment of the nonpolar constant current semiconductor device shown in FIG. 15 wherein the terminals made to the diffused layer are on the opposite faces of the substrate.

One of the first publications concerning the present subject matter is found in the Proceedings of the I.R.E., volume 47, pages 44–56 by R. M. Warner, Jr., W. H. Jackson, E. I. Doucette and H. A. Stone, Jr., concerning a constant current semi-conductor device having a space charge layer for a field effect and a Japanese patent application filed by some of the above-mentioned authors, the application having been published on Mar. 3, 1961, being Japanese patent application publication 1061 of 1961. This constant current device is also disclosed and described in U.S. Patent 2,954,486 to Doucette et al., issued September 27, 1960. As described later with reference to FIGURE 1, there is taught a device in which pinch-off effect was produced by a space charge layer which is created in P-region by the voltage drop caused by current when electric current was caused to flow in the semiconductor which has a P-N junction between a P-region, for example, of a low impurity concentration and an $N^+$-region of a high impurity concentration. However, the pinch-off effect was limited by the geometrical construction and, in order to lower the pinch-off voltage, it was necessary either to narrow the geometrical construction of the region where the space charge layer took place or to lower the impurity concentration to facilitate the spreading of the space charge layer.

Figure 1I:
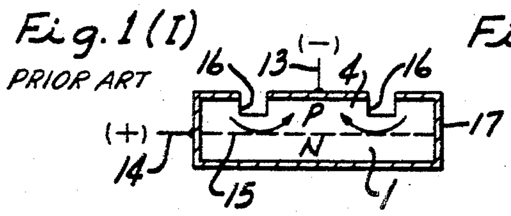
Figure 2:
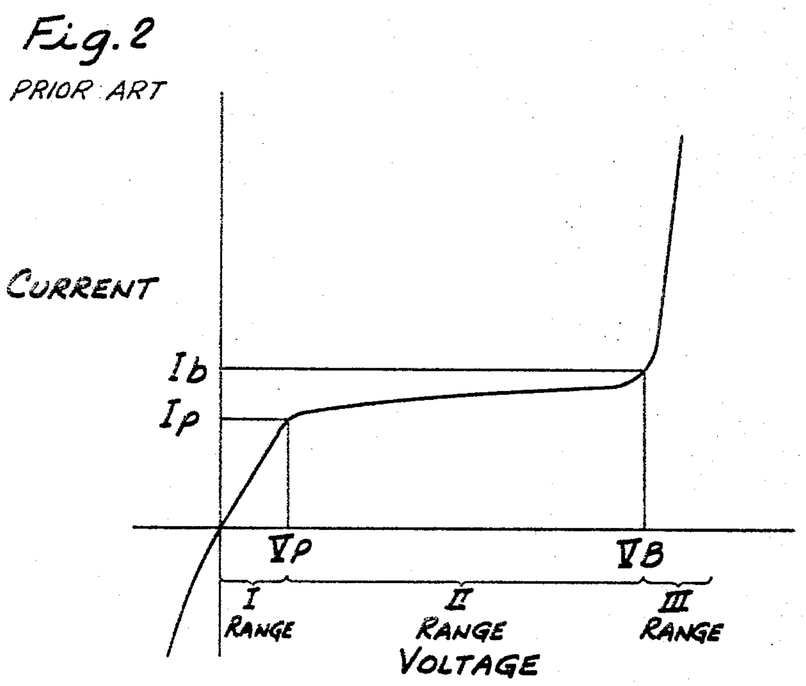

Now, we will explain: FIGURE 1(I) is a representative example of the prior art embodiment. A slice 1 of N-type semiconductor of silicon of single crystal is placed in a closed box and exposed to boron pentaoxide in a carrier-gas at the temperature of 1270° C. for about 24 hours, when a P-type conductive layer 4 of a thickness of 0.05 mm. is produced on either side. The slice is taken out of the box and the P-type layer on one side is scraped off mechanically or removed by an etchant. The slice then is made into a wafer, cutting it into a square piece having a side of 2.29 mm. each and a thickness of approximately 0.31 mm. As shown in FIGURE 1(I), this wafer will then consist of a region 4 of P-type conductivity having a thickness of 0.05 mm. and a thicker region 1 of the original N-type material. The wafer is then cleaned and its entire surface is gold-plated to a thickness of several tenths of one mil. A circular groove 16 is made in the form of a band or a hem on the P-type surface of the wafer. A preferred method for making the groove 16 is to employ the ultra-sonic cutting process which penetrates the gold-plated part and the silicon part underneath it. The substance in the remaining part is removed by means of a suitable etchant such as a dilute solution of hydrogen fluoride, which etches silicon but not gold. The removal of the edge part of the gold plating on the P-type surface is completed by applying a suitable wax to the whole area except for this part and treating the wafer coated with wax to eliminate the exposed part of gold plating with aqua regia. Then the wax coating is removed and the etching of the groove 16 is completed as mentioned above. Usually, the groove has a width of approximately 0.10 mm. and an outer circumferential length of approximately 6.09 mm. As this groove advantageously has a depth of 0.084 mm., its bottom is close to the interior by approximately 0.0025 mm. but does not reach the P-N junction 15 in the wafer. Finally, electrodes 13 and 14 are attached to the gold plating. The source electrode 14 is attached to the gold-plating 17 which encases both the N- and P-region. The drain electrode 13 is attached to the gold-plating in the center which is limited to the P-region. If electric current is caused to flow in the wafer thus obtained, with the source electrode 14 positive and the drain electrode 13 negative, the current-voltage characteristic curve shown in FIGURE 2 is obtained. The curve in FIGURE 2 shows the characteristic before pinch-off in the voltage range I, the characteristic during pinch-off in the voltage range II and the characteristic after breakdown in the voltage range III. The abscissae $Vp$ and $Vb$ indicate the pinch-off voltage and the breakdown voltage respectively. The current-voltage characteristic obtained from this wafer is, as shown in FIGURE 2, that in the voltage range II, the current scarcely increases even if voltage becomes higher. That is to say, $Ib-Ip \doteqdot 0$. It. therefore, acts asan effective current limiter and, compared with the limiters of other types hitherto available, has an advantage that it can be made in an extremely small size. As is widely known, such a constant current device is found useful for the control and protection of various electrical circuits. It is used, for example, for a constant current source, limited current circuit, circuit protection and converter for square waves etc.

Figure 1:
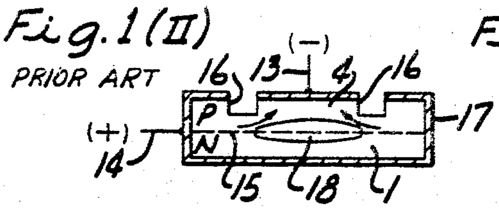
Figure 1:
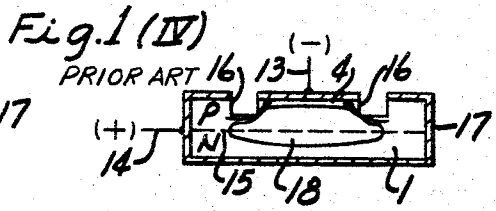

The action and effect of such a constant current semiconductor device heretofore used and known are now explained below:

Referring to FIGURE 1(II), if negative voltage is applied to the drain electrode 13 and positive voltage to the source electrode 14, the current flows from the source electrode 14 through the gold plating 17 into the P-type electroconductive layer 4 from the circumferential part of the device, passes between the lower surface of the groove 16 and the P-N junction surface 15 and flows into the drain electrode provided in the central part. On the other hand, as the voltage between the bottom part of the drain electrode 13 and the P-N junction surface under it shows the greatest voltage drop in the interior of this device, the space charge layer 18 due to field effect takes place to the greatest magnitude in this interior part. As electric current can scarcely flow in this space charge layer 18, the condition is such that, until the space charge layer develops and reaches the groove 16, electric current can flow in proportion to the area of the gap. As much electric current as is corresponding to the voltage range I of FIGURE 2 can then flow. As the voltage rises, however, the gap area becomes very small. If the voltage is in the voltage range II of FIGURE 2, namely, if the voltage exceeds $Vp$, the current is in a pinched off condition, there flowing only the current ($Ip$) limited by the small gap between the space charge layer and the groove 16 as shown in FIGURE 1(III).

While the voltage is in the voltage range II of FIGURE 2; namely, while the voltage is below the breakdown voltage $V_B$ the higher the voltage rises, the more intense the electric field becomes, so that the space charge layer grows further and becomes larger and larger, leaving only a very small gap, as mentioned above, along the groove 16 and on its surface as shown in FIGURE 1(IV). During this time, electric current flows into the drain electrode 13 passing only through the said small gap between the groove 16 and the space charge layer 18. Thus, the current scarcely increases if the voltage is in the voltage range II of FIGURE 2 but is kept at a constant value.

What has been mentioned above is an explanation of the method of manufacture, construction and performance of the constant current semiconductor device heretofore in use, made for the purpose of clarifying the characteristic features of the present invention. The present invention is to make it possible to obtain such a constant current semiconductor device of the conventional type in a simple and precise way by the introduction of an inversion layer.

Now we will explain this invention with reference to one of its embodiments. FIGURE 3 show one of the manufacturing processes. In Step I, an N-type silicon substrate 1, 200μ in thickness and 25 mm. in diameter, having an electrical resistivity of 5–10Ω/cm., is polished to a mirror-like surface, and in Step II an $SiO_2$ film 2 is made over the surface. This can easily be obtained by heating the substrate 1 to about 1,000–1,300° C. in the atmosphere of wet oxygen that has been passed through $H_2O$ at 80° C. In Step III, a round hole 3 of a diameter of 200μ is made in the $SiO_2$ film by the photo etching technique. In Step IV, an impurity which can give the substrate a P-type property (for example, boron) is caused to be diffused thereon through the hole 3. As the impurity that gives a P-type property, such as boron, has a characteristic that it does not penetrate the film of $SiO_2$, it is diffused only at the portion 3 where the film of $SiO_2$ has previously been removed, and produces a P-type diffused layer 4. This process is carried out by placing boron trioxide in a lower temperature furnace set at 1,000° C., placing the silicon substrate in a higher temperature furnace set at 1,000–1,200° C., and causing argon carrier gas and $O_2$ gas to flow from the lower temperature furnace to the higher temperature furnace. In Step V, an $SiO_2$ film 5 is made over the surface of the diffused part by again oxidizing the specimen. For example, if the silicon substrate is placed in an electric furnace heated to 1,150° C. and wet oxygen passed through $H_2O$ at 80° C. is caused to flow at the rate of 3 liters per minute, an $SiO_2$ film having a thickness of 1.2$\mu$ will be obtained in two hours. At this time, it is possible to make an inversion layer 6 under the $SiO_2$ film 5 by controlling the impurity concentration of the diffused layer, the thickness of the $SiO_2$ layer 5 and the manufacturing conditions for the oxidized film. An exceedingly thin N-layer extends over the whole surface under the $SiO_2$ film.

This phenomenon is remarkably effective on P-type layers.

In Step VI, only the parts 7, 8 of the $SiO_2$ film are removed by photo etching technique for the purpose of accommodating electrodes. When making the electrode hole 7, a part of the inversion layer disappears as a result of the removal of the $SiO_2$ film and the P-type diffused layer becomes exposed to the surface. This is because of a surface barrier between the $SiO_2$ film 5 and the silicon substrate 1.

As the causes for the generation of this inversion layer, the following two are conceivable. The first is the effect of the trap or barrier existing in the $SiO_2$ film and the interface between $SiO_2$ and the silicon substrate. The second is the effect of the segregation of impurity between $SiO_2$ film and the silicon substrate. An appropriate inversion layer can be provided by regulating impurity concentration of silicon and the oxidizing conditions for the $SiO_2$ film formation. In case of an inversion layer produced by the above first-mentioned effect, the inversion layer disappears when the $SiO_2$ film is removed. As mentioned in the previous paragraph.

Figure 4:
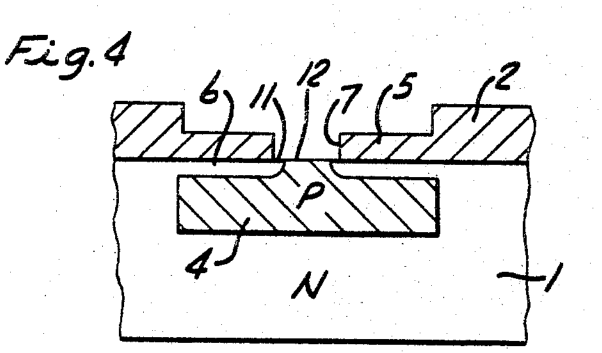
FIG. 4 is an enlarged sectional view of a part of the constant current semiconductor device obtained by the process as shown in FIGS. 3(I) through 3(VII) with a small portion of the inversion layer exposed through the outer oxide layer.

It is, however, possible to have an inversion layer 6 extending under the electrode hole 7 as shown in FIGURE 4, depending on the conditions of impurity concentration of the diffused region and the oxidizing conditions in formation of the oxide layer when forming this inversion layer, and it is possible to have the surface 12 of the P-type diffused layer and N-type inversion layer 11 in the same electrode hole 7.

In Step VII, such a metal as aluminum is deposited by the vacuum evaporation technique on the electrode holes 7, 8 and electrodes 9 10 are made to complete the constant current semiconductor device.

Figure 5:
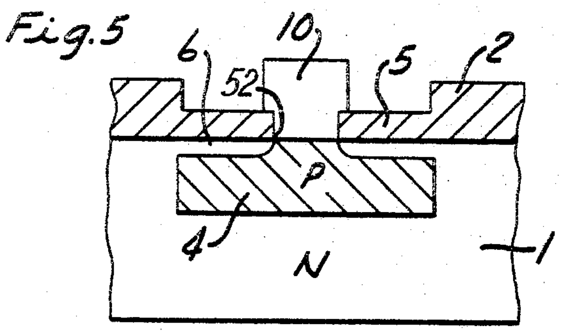
FIG. 5 is an enlarged sectional view of a part of the constant current semiconductor device obtained by the process as eshown in FIGS. 3(I) through 3(VII) with a small portion of the inversion layer exposed through the outer oxide layer.

In case where the inversion layer 6 is not exposed in the electrode hole 7 as shown in FIG. 5, heating is made after an aluminum electrode 10 is provided by the vacuum evaporation technique. As a result of heating, aluminum diffuses in the interface 52 of the $SiO_2$ film 5 and the inversion layer 6, producing the same effect as in the aforementioned case of FIG. 4.

FIGURE 3(VII) is a sectional view of the constant current semiconductor device completed by the above-mentioned process. If a voltage is applied between the electrode 10 and the electrode 9 of this device, a current-voltage characteristic as shown in FIGURE 2 is generally observed. The feature of this characteristic is that a constant current value is had for a certain range of voltages. That is to say, a constant current $Ip$ is maintained between $Vp$ and $V_B$ of FIGURE 2. The reason for this continuance of a constant current value will be explained with reference to FIGURE 6. FIGURE 6(I) shows a space charge layer which has taken place at the junction as a result of the application of a reverse voltage across the junction. At this time, the current is flowing in the inversion layer 6. If the voltage is raised, the space charge layer extends to the surface and, contacting a point on the surface 50, creates "pinch-off" as shown in FIG. 6(II). The voltage at this time is called the pinch-off voltage $Vp$, which corresponds to the $Vp$ shown in FIGURE 2.

If the voltage is further increased, the space charge layer spreads in the inversion layer towards the electrode 9. At this time, the space charge layer in the inversion layer 6 does not change its geometrical shape when the voltage is raised in excess of $Vp$ but retains the shape it has at the pinch-off voltage $Vp$. As this space charge layer is subjected to a voltage $Vp$, $Ip$ is also maintained. If a part of the $SiO_2$ film 5 is made thinner by forming a groove by etching or the like as shown in FIGURE 7, the inversion layer decreases and the "pinch-off" takes place at the surface 51, thereby making it possible to change the voltage value while maintaining a constant current.

The foregoing is the explanation of a typical embodiment of the present invention. Explanation of other embodiments follow.

While Step VI of FIGURE 3 demonstrates the formation of the hole 8 for an electrode or terminal extending to the substrate and the hole 7 for an electrode or terminal extending to both the diffused layer and inversion layer in the same face, FIGURE 8 shows an embodiment in which the holes 7 and 8 are formed on opposite faces of the substrate for electrodes or terminals 20 and 21, respectively, with the object of making subsequent assembling easier. FIGURE 9 shows an example of the constant current semiconductor device manufactured in accordance with this embodiment.

In FIG. 9, a glass tube 22 is used to mount and enclose the constant current semiconductor device 26 of the type shown in FIG. 8. The lead wires 23 and 24 are connected to the electrodes or terminals of the device. The metal piece 25 is used as a base to mount the semiconductor device thereon prior to enclosing this assemblage in the glass tube 22.

FIGURE 10 shows an embodiment where holes 3 are made in two places in the substrate 1 above two diffused regions 4 instead of single region by the photo etching process as in Step III of FIGURE 3. Subsequent steps of diffusion, oxidation and photo etching are carried out in the same way as in the previously described embodiment, and the electrodes 27 and 28 are formed in the holes 3 as shown.

The device manufactured by the method of this embodiment has a voltage current characteristic as shown in FIGURE 11 and is effective, for example, as a current limiting device for alternating currents.

FIGURE 12 shows an embodiment wherein the electrodes 29 and 30 are made in opposite sides of the substrate 1 and the diffused regions 4, while the embodiment shown in FIGURE 10 has two electrodes 27 and 28 on the same face or surface of the substrate 1. The embodiment of FIG. 12 has the same effect as the embodiment shown in FIGURE 8.

In the all above mentioned embodiments the substrate 1 is of N-type silicon. The present invention, however, is capable of embodiments where P-type silicon is used for the substrate 1.

FIGURE 13 shows one manufacturing procedure for this embodiment of the device. In Step I, a P-type silicon substrate 31 of a thickness of 200$\mu$ and diameter of 25 mm. having an electrical resistivity of 5–10 $\Omega$/cm. is polished to a mirror-like surface. In Step II, an $SiO_2$ film 32 is provided on the surface of the above-mentioned substrate. This is done by 2 hours' heating of the substrate 31 at 1,150° C. in the atmosphere of wet oxygen that has passed $H_2O$ at 80° C. At this time it is possible to produce an inversion through layer 33 under the $SiO_2$ film 32 by controlling the impurity concentration of the substrate, the thickness of the $SiO_2$ film and the conditions for making the oxidized film. This is a very thin N-layer 33 extending under the whole surface of the $SiO_2$ film.

In Step III, a disc-shaped part having a diameter of 200$\mu$ of the $SiO_2$ film 32 is removed by the known photo etching technique to produce a hole 34. In Step IV, an impurity which gives the N-type properties (phosphorus for example) is diffused. As such an impurity as phosphorus which gives the N-type properties has a property that it does not penetrate the $SiO_2$ film, it is diffused only in the hole 34 where the $SiO_2$ film has previously been removed, so that an N-type diffused layer 35 may be formed there. This process is carried out by placing phosphorus pentaoxide in a lower temperature furnace set at 200° C., placing the silicon substrate in a higher temperature furnace set at 1,100° C. and causing argon carrier gas and $O_2$ gas to flow from the lower temperature furnace to the higher temperature furnace. At this time, the flow of $O_2$ gas is at the rate of 3 liters per minute, and oxidation is effected at the same time as diffusion occurs because of the presence of the $O_2$ gas.

In Step V, the $SiO_2$ film only in the portions 36 and 37 is removed by photo etching technique in order to accommodate the electrodes 39. As $SiO_2$ film was removed when making the electrode hole 34, a part of the inversion layer disappears when making the electrode holes 37 and the P-type substrate is exposed.

Then, in Step VI, an electrode 38 is connected to the diffused layer 35 and electrodes 39 are connected to both the inversion layer 33 and substrate 31 as previously indicated to complete the device.

FIGURE 14 shows an improved P-type silicon embodiment in which the electrodes 40 and 41 are positioned on the top and bottom faces of the device, while the electrodes 38 and 39 of the embodiment shown in FIGURE 13(VI) are positioned in the same face. The FIG. 14 embodiment facilitates in subsequent circuit assembling.

FIGURE 15 shows an embodiment in which, unlike that in Step III of FIGURE 13 where only one hole 34 is formed by the photo etching technique, two holes are formed and electrodes 42 and 43 are connected to their respective diffused layers 35 after the previous steps of diffusion, oxidation and photo etching as previously mentioned. The characteristic voltage-current curve is shown in FIGURE 11.

FIGURE 16 shows an embodiment where the electrodes 44 and 45 are provided on the top and bottom faces of the device, while the electrodes 42 and 43 of the embodiment shown in FIGURE 15 are provided in the same face. As mentioned with respect to FIG. 14, the embodiment of FIG. 16 facilitates subsequent circuit assembling.

In summary, the constant current semi-conductor device according to the present invention is as follows: By producing the oxidation film of $SiO_2$ or the like on a P-type diffused layer or region, and inversion layer is produced between the P-type diffused region and the oxidized film layer. By removing a part of the oxidized film layer, a part of the above-mentioned inversion layer is removed to expose the P-type diffused region under the inversion layer, both the diffused region and inversion layer then connected to electrodes. In this way, the channel of accurate thickness that has never been obtained in the constant current devices heretofore manufactured, is produced in a simple way. In addition, the thickness of the channel can be accurately controlled by changing the conditions for the production of said oxidation film, so that the value of $Vp$ of the voltage-current characteristic curves shown in FIGURE 2 and FIGURE 9 can be made lower than known before. This makes it possible to obtain a characteristic ideal for a constant current device. As the characteristic of the constant current device can be accurately controlled by changing the conditions for the production of the oxidation film, it has an advantage over the heretofore manufactured devices with grooves made by machining so that the thickness of the channel can be made more precise. It is thus made possible to obtain constant current semi-conductor devices of a stabilized quality. As to the thickness of the channel, if the thickness of the oxide film made on its surface is great, the thickness of the inversion layer is also great, so that the thickness of the channel may be made great. Consequently, it is made possible to make accurate and free selection of the desired value $Ip$ of constant current and desired pinch-off voltage $Vp$.

Furthermore, the constant current device according to the present invention shows no change in characteristics when its surface is soiled, because almost the whole of its surface is covered with an oxide film, so that such a surface finishing as gold plating heretofore required is no longer necessary. If a surface protecting covering is made as done in the part over the oxide film, changes due to ageing and changes due to contamination can be further reduced. In the case of the devices heretofore made, it has been necessary to employ machining process to make grooves as already mentioned and to shape the constant current semi-conductor device. They are inherently of such a construction and characteristics that their performance is determined by their outer form. Consequently, the dimensions and shape of such constant current devices are restricted in order to obtain the desired constant current characteristics. However, the constant current device manufactured in accordance with the present invention does not require machining, and its characteristics are not affected by its shape. It can be made smaller than such devices heretofore manufactured and has an advantage that it may be fitted in a solid state circuit on the same wafer as other circuit elements. Thus the present invention furnishes a constant current device which is by far more advantageous than those heretofore supplied with respect to manufacture, construction and circuit application.

What we claim is:

1. A polar constant current semiconductor device comprising a first region of one conductivity type semiconductor substrate, a second region of opposite conductivity type diffused onto one surface of said first region and located on a surface portion of said first region surface, a third region comprising the oxide of the semiconductor substrate to cover said surface of said first region, an inversion layer of the same conductivity type as said first region formed at the interface between said second region and said third region to isolate as an island said second region to provide a current channel, a first terminal connected through an opening provided in said third region to couple both said second region and said inversion layer together and a second terminal connected to said first region.

2. The polar constant current semiconductor device of claim 1 characterized in that said second terminal is connected to a surface of said first region opposite to said surface of said first terminal connected to couple said second region and said inversion layer.

3. The polar constant current semiconductor device of claim 1 characterized by a groove around said first terminal of selected dimension in the surface of said third region above said diffused second region to selectively vary the geometrical properties of said channel and said second region to change the current limiting characteristics of the device.

4. The polar constant current semiconductor device of claim 1 characterized in that said first region and said inversion layer are of N conductivity type and said diffused second region is of P conductivity type, said first terminal fused in said opening to couple together both said diffused second region and said inversion layer.

5. A nonpolar constant current semiconductor device comprising a first region of one conductivity type semiconductor substrate, two second regions of opposite conductivity type independently diffused into one surface of said first region and located on separate surface portions of said first region surface, a third region comprising the oxide of the semiconductor substrate to cover said surface of said first region, inversion layers of the same conductivity type as said first region formed at the interface between said second regions and said third region to isolate as an island said diffused second regions to provide current channels, and terminals each connected through openings prepared in said third region to couple together both one of said second regions and its overlying inversion layer.

6. The nonpolar constant current semiconductor device of claim 5 characterized in that said second regions are diffused into opposed surfaces of said first region with said inversion layers formed at said interfaces, said terminals connected to couple their respective second region and inversion layer.

7. The nonpolar constant current semiconductor device of claim 5 characterized in that said first region and said inversion layers are of N conductivity type and said diffused second regions are of P conductivity type, said terminals fused in said openings to couple together, respectively, both their diffused second region and inversion layer.

References Cited

UNITED STATES PATENTS

| | | | |
|---|---|---|---|
| 2,899,344 | 8/1959 | Atalla et al. | 148—1.5 |
| 2,954,486 | 9/1960 | Doucette et al. | 307—88.5 |
| 3,040,218 | 6/1962 | Byczkowski | 317—234 |
| 3,226,612 | 12/1965 | Haenichen | 317—234 |
| 3,226,614 | 12/1965 | Haenichen | 317—234 |

JOHN W. HUCKERT, *Primary Examiner.*

J. R. SHEWMAKER, *Assistant Examiner.*

U.S. Cl. X.R.

317—235